(12) United States Patent
Van Veen et al.

(10) Patent No.: US 9,315,422 B2
(45) Date of Patent: Apr. 19, 2016

(54) MANUFACTURE OF PERFUME STONES

(71) Applicants: Renee Susan Van Veen, Cleveland (AU); Jean Pierre Goedermans, Capalaba (AU)

(72) Inventors: Renee Susan Van Veen, Cleveland (AU); Jean Pierre Goedermans, Capalaba (AU)

(*) Notice: Subject to any disclaimer, the term of this patent is extended or adjusted under 35 U.S.C. 154(b) by 57 days.

(21) Appl. No.: 14/246,512

(22) Filed: Apr. 7, 2014

(65) Prior Publication Data

US 2014/0366778 A1 Dec. 18, 2014

(30) Foreign Application Priority Data

Jun. 15, 2013 (AU) ................................ 2013206348

(51) Int. Cl.
| | |
|---|---|
| *C04B 28/04* | (2006.01) |
| *A44C 15/00* | (2006.01) |
| *A44C 17/00* | (2006.01) |
| *A44C 25/00* | (2006.01) |
| *B28B 5/00* | (2006.01) |
| *B28B 11/24* | (2006.01) |

(52) U.S. Cl.
CPC ............... *C04B 28/04* (2013.01); *A44C 15/002* (2013.01); *A44C 17/00* (2013.01); *A44C 17/007* (2013.01); *A44C 25/001* (2013.01); *B28B 5/00* (2013.01); *B28B 11/243* (2013.01)

(58) Field of Classification Search
CPC ...................................................... C04B 28/04
See application file for complete search history.

(56) References Cited

U.S. PATENT DOCUMENTS

| | | | |
|---|---|---|---|
| 2,564,860 | A | 8/1951 | Ryberg |
| 2008/0178819 | A1 | 7/2008 | Sia |

FOREIGN PATENT DOCUMENTS

| | | |
|---|---|---|
| WO | WO0026026 | 5/2000 |
| WO | 2007125311 | 11/2007 |

*Primary Examiner* — Paul Marcantoni
(74) *Attorney, Agent, or Firm* — Stephen T. Scherrer; Monique A. Morneault; Scherrer Patent & Trademark Law, P.C.

(57) ABSTRACT

Perfumed stones adapted to store perfume so as to release the smell over an extended period, and a method of manufacture of perfumed stones, is disclosed. The stones find particular suitability in perfumed jewelry.

20 Claims, 4 Drawing Sheets

MANUFACTURE OF PERFUME STONES

RELATED APPLICATIONS

The present application claims priority from Australian patent application number 2013206348 filed Jun. 15, 2013, the disclosure of which is hereby incorporated in its entirety.

TECHNICAL FIELD

The present invention is directed to improvements in manufactured stones/nuggets adapted to store perfume so as to release the smell over an extended period. The stones find particular suitability in perfumed jewelry.

BACKGROUND

Any references to methods, apparatus or documents of the prior art are not to be taken as constituting any evidence or admission that they formed, or form part of the common general knowledge.

It is known to infuse perfumes, fragrances and essential oils into solid objects for slow release. One type of solid object is commonly known as a "stone". These stones are usually pebble sized and are made from unglazed ceramic material. These stones can be used in jewelry manufacture and can be placed in a decorative locket around a wearer's neck. Thus it is known to identify these pebbles as "perfume stones".

One disadvantage with perfume stones is the difficulty in efficiently manufacturing the stones to any desired shape and size. Another difficulty is in ensuring that the stones are not too soft (and therefore prone to crumbling, flaking and the like), or too hard that they may damage the jewelry. Another difficulty is in the manufacture of stones with the right degree of porosity to enable fragrances to be infused into the stone by absorption and/or adsorption and to release the fragrance at an acceptable rate to not be too overpowering, or too hard to detect.

Perfume stones used in jewelry can also be called "jewelstones" but are not to be confused with gemstones.

It is an object of the invention to provide a perfume stone that overcomes at least some of the above mentioned disadvantages or provide a useful or commercial choice in the marketplace.

SUMMARY OF THE INVENTION

According to a first aspect of the present invention there is provided a perfume stone comprising calcium sulphate, settable material and silica.

Suitably, the calcium sulphate is present in an amount of between 80%-95%.

Suitably, the calcium sulphate comprises gypsum.

Suitably, the settable material is present in an amount of between 5%-20%.

Suitably, the settable material comprises cement. Suitably the cement comprises a portland cement or lime cement. The cement may comprise Portland cement blends such as blast-furnace cement, flyash cement, pozzolan cement, silica fume cement, white blended cement or geopolymer cement.

Suitably, the settable material comprises a resin. The resin may comprise a resin blended with other fillers.

Suitably, the calcium sulphate originates from calcium sulphate hemihydrate.

Suitably, the silica is present in an amount of between 1%-5%. The silica may comprise crystalline Silica. The crystalline silica may comprise one of more of: $\alpha$-quartz, $\beta$-quartz, $\alpha$-tridymite, $\beta$-tridymite, $\alpha$-cristobalite, $\beta$-cristobalite, faujasite, melanophlogite, keatite, moganite, coesite, stishovite, fibrous, seifertite and the like.

In a particularly preferred embodiment, the stone comprises calcium sulfate 95%, Portland cement 5% and silica 1%.

The stone can have any desired shape and configuration. Thus the stone may be spherical, oval, hemispherical, cubic, cylindrical, conical, frusto-conical, disk like, plate like, or have an irregular shape.

The size and weight of the stone, for use in jewelry will need to take into consideration the type of jewelry, the weight of the stone and the like. It is expected that the stone will have a weight of between 1-100 grams and a size of between 1-10 cm across.

In a particularly preferred embodiment the stone is as follows:
  Shape: 8 sided diamond
  Size: 8 mm across the top face, 12 mm high and 3.5 mm across the bottom face, widest point 14 mm
  Weight: 1.7 grams Suitably, the stone is manufactured using a moulding step. An advantage of this is the ready ability to make stones of particular shapes, sizes and configurations without the need for grinding or cutting.

In another form, the invention comprises a perfume stone manufactured from calcium sulphate, settable material and silica and having a moulding step in the manufacturing process.

The stone can have the components and amounts given above.

In another form, the invention comprises a method of manufacture a perfume stone comprising combining admixing together the calcium sulphate in particulate form and the silica in particulate form and the settable material for a time period, adding an aqueous material, mixing the components, pouring the mixture into a mould and allowing the mixture in the mould to set to form the stone.

The amounts of the components may be as described above. The calcium sulphate is preferably calcium sulphate hemihydrate or plaster of paris.

The settable material preferably comprises a dry particulate cement to be mixed with the silica and calcium as a dry mixture.

The time period may be between 30 seconds-1 hour and preferably between 30 sec-5 min and most preferably about 1 minute or sufficiently to create perfect consistency in the mixture.

The aqueous material may comprise water or water combined with additives inter alia to improve viscosity in the mix, curing rates, plasticity, and the like. The additives may comprise alcohols, glycols, glycerols, oils, slip agents, thixotropic agents and the like.

The amount of aqueous material to solid materials may comprise between 1:4 and suitably between 1:3 and preferably about 1:2.6. In an embodiment, 600 ml water may be added to 1.6 Kg of the solid mix.

Suitably the temperature of the mixing process is maintained at about room temperature or slightly elevated temperature and this may be between 20-40 degrees Celsius.

Suitably, the mixing is carried out in batches of between 1-5 kg of solid materials and preferably between 1-2 kg of solid materials.

Suitably, the setting time is between 15 min-5 hours and preferably about 1 hour to form "green" stones Suitably, the "green" stones are dried at room temperature for between 1 day-1 month, and preferably about 1 week. The temperature may be elevated.

Suitably the formed perfume stones are stored in an airtight environment after drying and at room temperature until perfume is infused into the stone.

Once the stones are prepared and ready for use, a desired perfume or mix can be impregnated into the stone. Any suitable type of perfume may be used. There are thousands of different types of perfumes and fragrances in the marketplace and these may be used with the stone. The perfume may be plant based, synthetic, animal based and the like and it is not considered that any unnecessary limitation should be placed on the type of perfume that can be used.

The perfume can be impregnated into the stone by suspending the stone in liquid perfume. Alternatively, the stone can be placed in a container containing a vapour form of the perfume or as a mist or aerosol.

The impregnated stone should be kept away from light and excessive heat and in a sealed environment. A decorative container such as a jewelry jar can be used.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

Example 1

Manufacture of a Stone 1.6 Kg of dry particulate flowable mix was prepared from Plaster of Paris 95%, Portland Cement 4% and Crystalline Silica 1%. Water 600 ml was added and the mix was blended together in an industrial cake mixer at 320 rpm for 60 seconds and at between 21-35 degrees Celsius to create the perfect consistency, the right compressive strength for the moulding process, and the right porosity for perfume absorption.

The mixture is poured into shaped moulds and is left in the moulds for one hour at room temperature to form "green" stones.

The "green" stones are removed from the mould, put onto drying racks and left for one week at room temperature, so that the drying process is even and the product dries to a constant weight and the physical properties remain intact and uniform.

Once dried, the stones are stored in airtight containers and at room temperature.

Example 2

Infusing the Stone with Perfume

A customer can select a particular type of jewellery and a particular perfume and the perfume can be impregnated into the stone by suspending the stone in the perfume.

Figure 5:
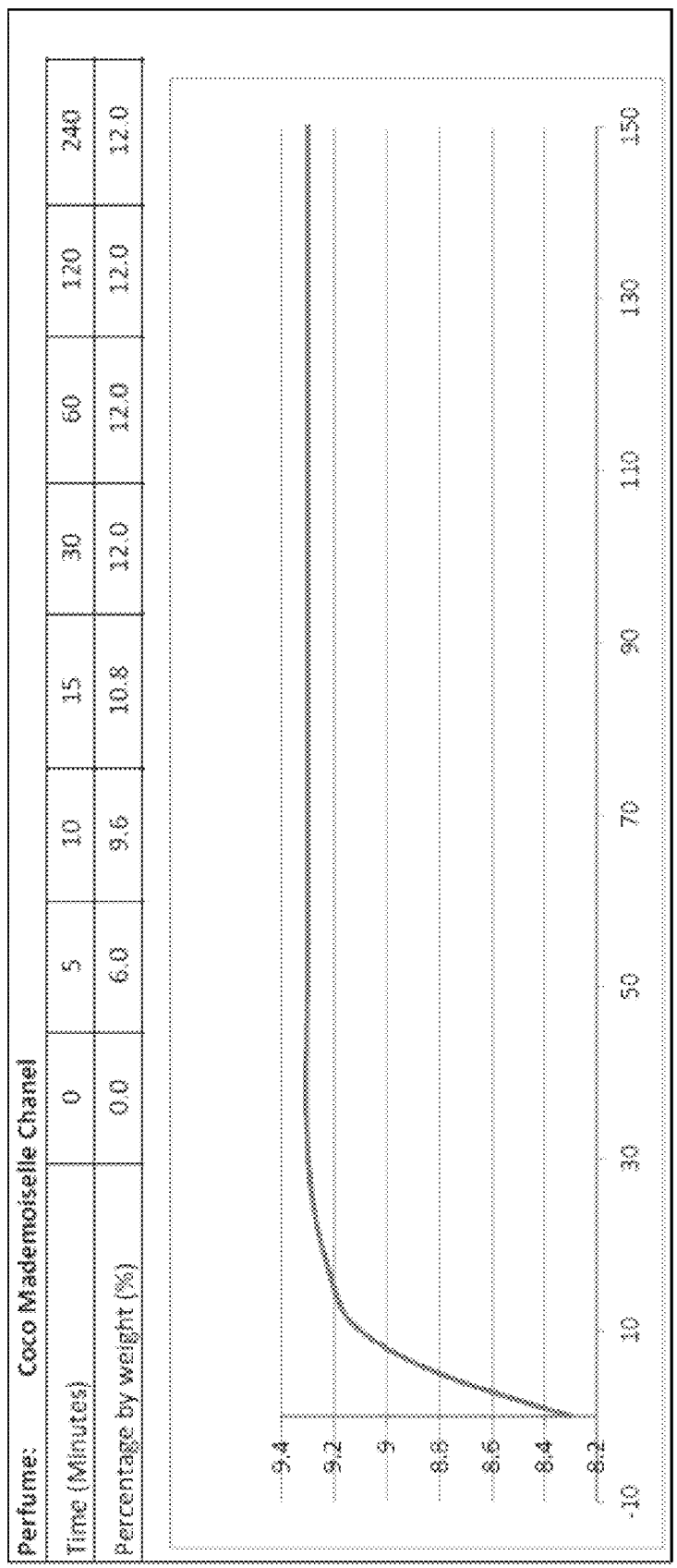
FIGS. 5-7 are graphs illustrating perfume infusion times into the stones for different perfumes.
Figure 6:
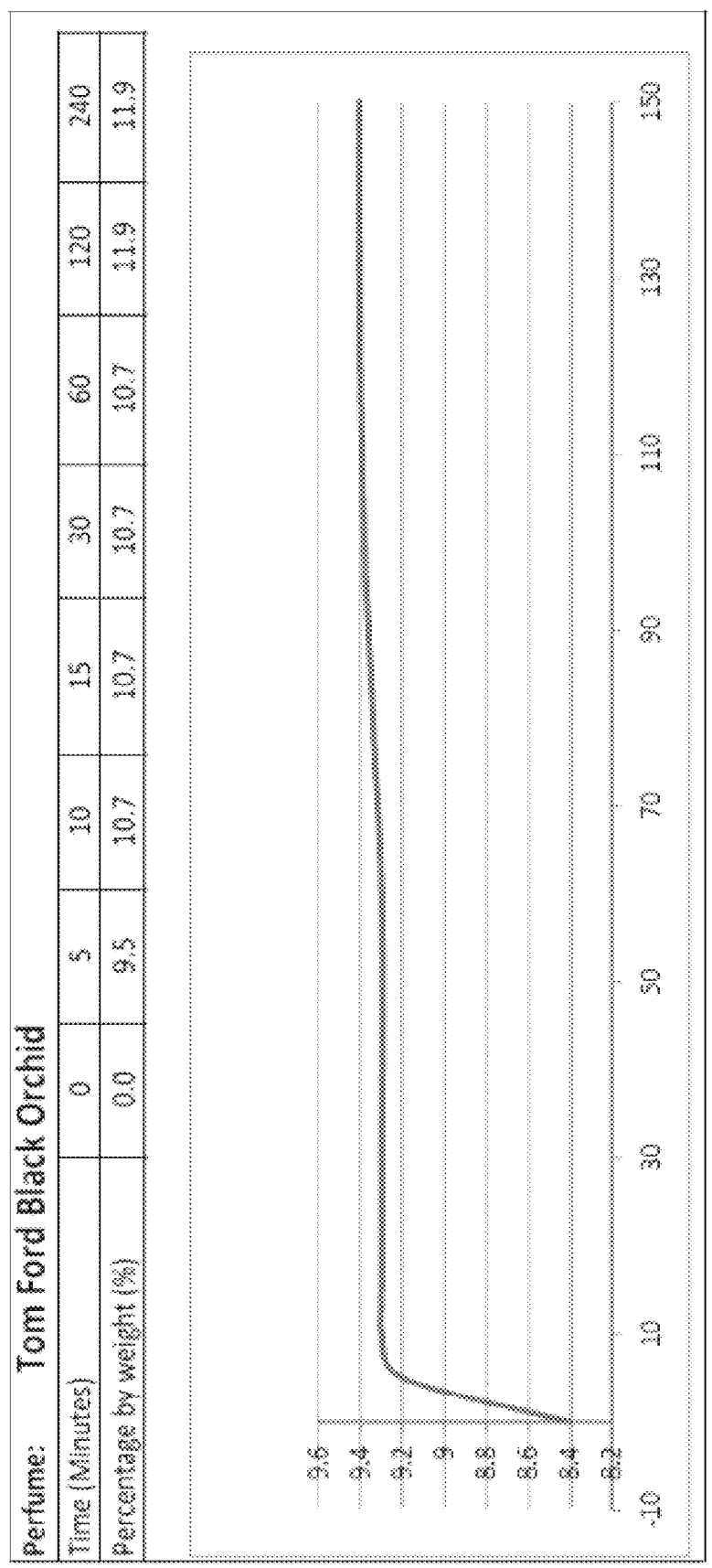
Figure 7:
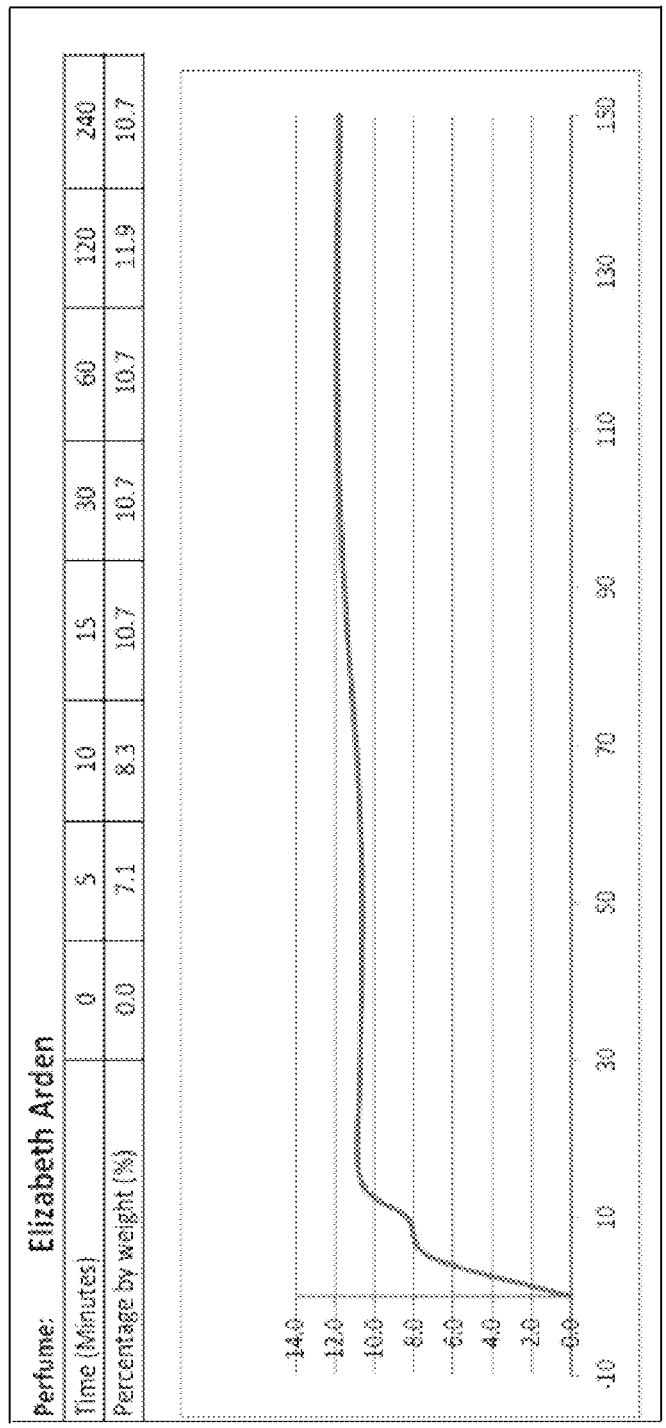

FIGS. 5 to 7 are graphs illustrating three known perfumes absorbed into a stone of between 1.5-1.9 grams. The graphs demonstrate that about 0.2 g of perfume is absorbed each time which also demonstrates the consistency of the stone manufacture according to preferred embodiments of the invention.

The stones are immersed for about 10 minutes, then removed and allowed to dry for about 2 minutes and then stored in airtight perfumed jars, ready for shipping and insertion into a pendant.

A customer can select a pendant and perfume. The perfume will be impregnated into a stone in the manner described above.

Figure 1:
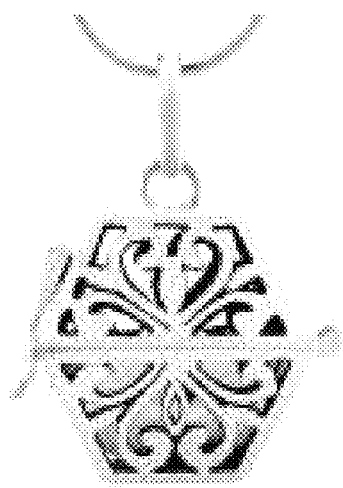
FIGS. 1-3 illustrate neck pendants containing a perfume stone or stones.
Figure 2:
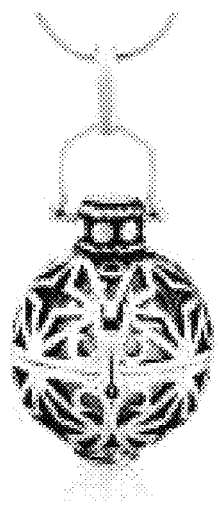
Figure 3:
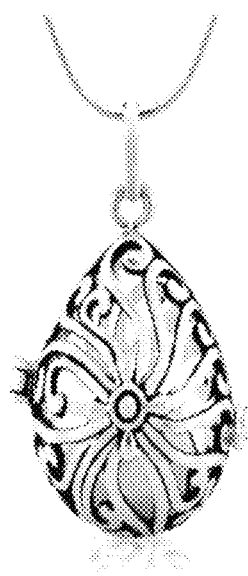
Figure 4:
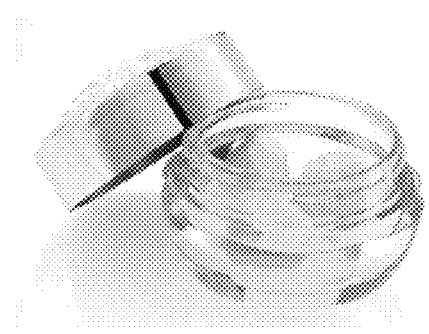
FIG. 4 depicts a container holding perfume stones.

The stone will be placed in an aesthetically pleasing jar an example of which is illustrated in FIG. 4. The combination will be packaged and sent to the client.

Inside the packaging there will be the selected pendant and the infused stone/s in its own jar with the client's chosen fragrance.

Instructions to the client upon receiving the package are as follows:

Unclasp your pendant.

Take one stone from the jar, place it inside the pendant and close the clasp.

Return the lid to the jar, making sure it is screwed on.

The stone will outlast its 28 day lifespan if returned to its jar when not in use.

Some benefits of the product according to preferred embodiments of the invention are as follows:

Perfumed Jewelry brings a woman's favorite perfume and jewelry together in one stunning filigree pendant. Each combination is unique and reflects the wearer's personality, mood and style.

Perfumed Jewelry allows a customer to choose their scent depending on their mood, the occasion, and it lasts all day.

Perfumed Jewelry is not simply a pendant or a perfume. It is a statement that proclaims 'I am unique'.

The above description identifies at least one specific, substantial and credible use for the invention.

The invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims, unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

We claim:

1. A perfume stone for wearing in a pendant, the stone having a composition comprising calcium sulphate, perfume, settable material comprising Portland cement and silica.

2. The stone as claimed in claim 1, wherein the calcium sulphate is present in an amount of between 80%-95%.

3. The stone as claimed in claim 1, wherein the calcium sulphate comprises gypsum.

4. The stone as claimed in claim 1, wherein the settable material is present in an amount of between 5%-20%.

5. The stone as claimed in claim 1, wherein the calcium sulphate originates from calcium sulphate hemihydrate.

6. The stone as claimed in claim 1, wherein the silica is present in an amount of between 1%-5%, and comprises a crystalline silica.

7. The stone as claimed in claim 1, comprising calcium sulfate 95%, Portland cement 4% and silica 1%.

8. The stone as claimed in claim 1, having a weight of between 1-50 grams and a size of between 1-10 cm across.

9. The stone as claimed in claim 8, having the following parameters:
   Shape: 8 sided diamond
   Size: 8mm across the top face, 12 mm high and 3.5 mm across the bottom face,
   widest point 14 mm
   Weight: 1.7 grams.

10. The stone as claimed in claim 1, manufactured using a moulding step in the manufacturing process.

11. The stone as claimed in claim 9, manufactured using a moulding step in the manufacturing process.

12. A method of manufacturing a perfume stone comprising combining the calcium sulphate in particulate form and the silica in particulate form and the settable material for a time period, adding an aqueous material, mixing the components, pouring the mixture into a mould and allowing the mixture in the mould to set to form the stone.

13. The method of claim 12, wherein the calcium sulphate comprises calcium sulphate hemihydrate.

14. The method of claim 12, wherein the aqueous material comprises water.

15. The method as claimed in claim 12, wherein the time period comprises approximately 60 seconds.

16. The method as claimed in claim 12, wherein the ratio of aqueous material to solid material is between 1:4 and 1:2.6.

17. The method as claimed in claim 12, wherein the setting time in the mould is about one hour.

18. The method as claimed in claim 17, wherein the stones are dried at room temperature for approximately 1 week after being removed from the mould.

19. The stone as claimed in claim 1 wherein the stone has a weight of between 1.5-1.9 grams and is capable of absorbing about 0.2 g of perfume.

20. The stone as claimed in claim 1 in combination with an item of jewelry, wherein the stone is held by the item of jewelry.

\* \* \* \* \*